United States Patent [19]
Ikeda et al.

[11] Patent Number: 5,586,448
[45] Date of Patent: Dec. 24, 1996

[54] DEFROSTING CONTROL SYSTEM FOR USE IN AN AIR-CONDITIONER IN AN ELECTRIC VEHICLE

[75] Inventors: Susumu Ikeda; Toshimi Isobe; Atsuo Inoue, all of Isesaki; Akihiro Tajiri, Wako; Masahiro Takagi, Wako; Mitsuru Ishikawa, Wako; Choji Sakuma, Wako; Nobuyuki Yuri, Wako, all of Japan

[73] Assignees: Sanden Corporation, Gunma-ken; Honda Giken Kogyo Kabushiki Kaisha, Tokyo, both of Japan

[21] Appl. No.: 477,869

[22] Filed: Jun. 7, 1995

[30] Foreign Application Priority Data

Jul. 6, 1994 [JP] Japan .................................. 6-155043

[51] Int. Cl.⁶ .................................................. B60H 1/00
[52] U.S. Cl. .................. 62/156; 62/230; 62/236
[58] Field of Search ............................ 62/156, 151, 154, 62/155, 230, 236, 278, 324.5, 160, 186, 239, 243, 244, 234

[56] References Cited

U.S. PATENT DOCUMENTS

| | | | |
|---|---|---|---|
| 4,882,908 | 11/1989 | White | 62/156 X |
| 4,944,158 | 7/1990 | Akiike et al. | 62/156 X |
| 5,284,025 | 2/1994 | Kajitani et al. | 62/278 X |
| 5,305,613 | 4/1994 | Hotta et al. | 62/230 X |

Primary Examiner—Harry B. Tanner
Attorney, Agent, or Firm—Lyon & Lyon

[57] ABSTRACT

An external heat exchanger of a heat pump air-conditioner on an electric vehicle is determined as being frosted based on signals from temperature sensors. If the external heat exchanger is frosted, then a frosting flag is set and the air-conditioner is operated in a cooling mode to radiate heat from the external heat exchanger for thereby defrosting the external heat exchanger while the air-conditioner is in a pre-air-conditioning mode before the driver enters the electric vehicle or while the battery on the electric vehicle is being charged. While the battery is being charged, the external heat exchanger is defrosted by the electric energy supplied from an external power supply to charge the battery.

15 Claims, 8 Drawing Sheets

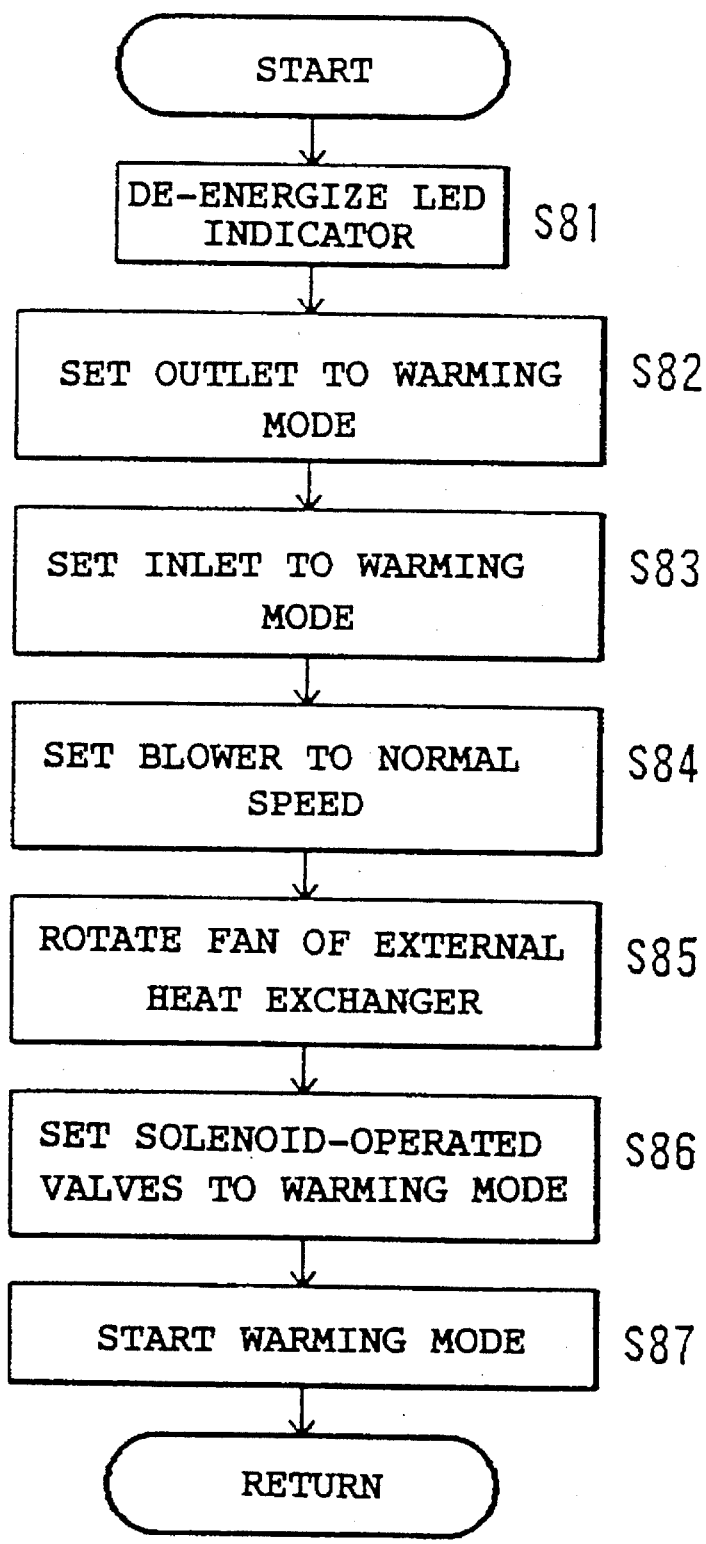

DEFROSTING CONTROL SYSTEM FOR USE IN AN AIR-CONDITIONER IN AN ELECTRIC VEHICLE

BACKGROUND OF THE INVENTION

1. Field of the Invention

The present invention relates to a defrosting control system for use in a heat-pump air-conditioner for air-conditioning an electric vehicle with a compressor that is electrically actuated by the electric energy stored in a battery on the electric vehicle.

2. Description of the Related Art

Generally, heat-pump air-conditioners are used on electric vehicles which are not equipped with a heat source such as an internal combustion engine. The heat-pump air conditioner controls the temperature of the cabin of an electric vehicle through a heat exchange between the thermal energy outside of the cabin and the thermal energy in the cabin using an external heat exchanger located outside of the cabin and an internal heat exchanger located in the cabin. When the heat-pump air conditioner operates in a warming mode to warm the cabin at the time the temperature outside of the cabin is low, the external heat exchanger often tends to become frosted. As the frost on the external heat exchanger progressively increases while the heat-pump air conditioner is in operation, the ability of the external heat exchanger to absorb heat is lowered, and hence the ability of the heat-pump air conditioner to warm the cabin is reduced, with the result that the cabin cannot be warmed as desired.

One solution is to switch the heat-pump air conditioner into a cooling mode to cool the cabin when the external heat exchanger is frosted. In this cooling mode, the external heat exchanger functions as a heat radiator to defrost itself. According to another proposal, an electric heater added to the external heat exchanger is energized to defrost the external heat exchanger when the external heat exchanger is frosted. These two schemes may be combined to defrost the external heat exchanger in a shorter period of time.

The former process is disadvantageous in that while the heat-pump air conditioner is operating in the cooling mode, a comfortable environment cannot be established in the cabin because the cabin is not warmed. The electric heater also poses problems because it consumes a large amount of electric energy, which is not desirable as the consumption of the electric energy stored in battery on the electric vehicle should be minimized, and also because the electric heater increases the cost of the electric vehicle.

SUMMARY OF THE INVENTION

It is therefore an object of the present invention to provide a defrosting control system for use in an air-conditioner on an electric vehicle, the defrosting control system being capable of defrosting an external heat exchanger with a low amount of energy at optimum times and also efficiently defrosting the external heat exchanger without unduly consuming the electric energy stored in a battery on the electric vehicle.

To achieve the above object, there is provided in accordance with the present invention a defrosting control system in a heat-pump air-conditioner for air-conditioning an electric vehicle with a compressor that is electrically actuated by the electric energy stored in a battery on the electric vehicle, comprising frosting determining means for determining whether an external heat exchanger of the air-conditioner is frosted or not, air-conditioning operation detecting means for detecting whether the air-conditioner is operating in a pre-air-conditioning mode before a driver enters the electric vehicle, and defrosting means for operating the air-conditioner to defrost the external heat exchanger by causing the external heat exchanger to function as a heat radiator if the external heat exchanger is determined as being frosted by the frosting determining means and also if the air-conditioner is determined as operating in the pre-air-conditioning mode by the air-conditioning operation detecting means.

The defrosting control system further comprises charging condition detecting means for detecting whether the battery is being charged by an external power supply or not, the defrosting means comprising means for operating the air-conditioner to defrost the external heat exchanger with electric energy from the external power supply if the external heat exchanger is determined as being frosted by the frosting determining means and also if the battery is determined as being charged by the charging condition detecting means.

With the above arrangement, if the external heat exchanger is determined as being frosted by the frosting determining means, then when the air-conditioner is determined as operating in the pre-air-conditioning mode by the air-conditioning operation detecting means, the air-conditioner is operated to radiate heat from the external heat exchanger for thereby defrosting the external heat exchanger. Since the driver is not on board the electric vehicle, the external heat exchanger can be defrosted without making the driver uncomfortable. Furthermore, the external heat exchanger can be defrosted with less energy as no electric heat is used.

If the external heat exchanger is determined as being frosted by the frosting determining means and also if the battery on the electric vehicle is determined as being charged by the charging condition detecting means, then the air-conditioner is operated with the electric energy from the external power supply to radiate heat from the external heat exchanger for thereby defrosting the external heat exchanger. Consequently, the external heat exchanger can be defrosted efficiently without consuming the electric energy stored in the battery.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 8 is a flowchart of a subroutine of a process for canceling the defrosting process.

DETAILED DESCRIPTION OF THE PREFERRED EMBODIMENT

Figure 1:
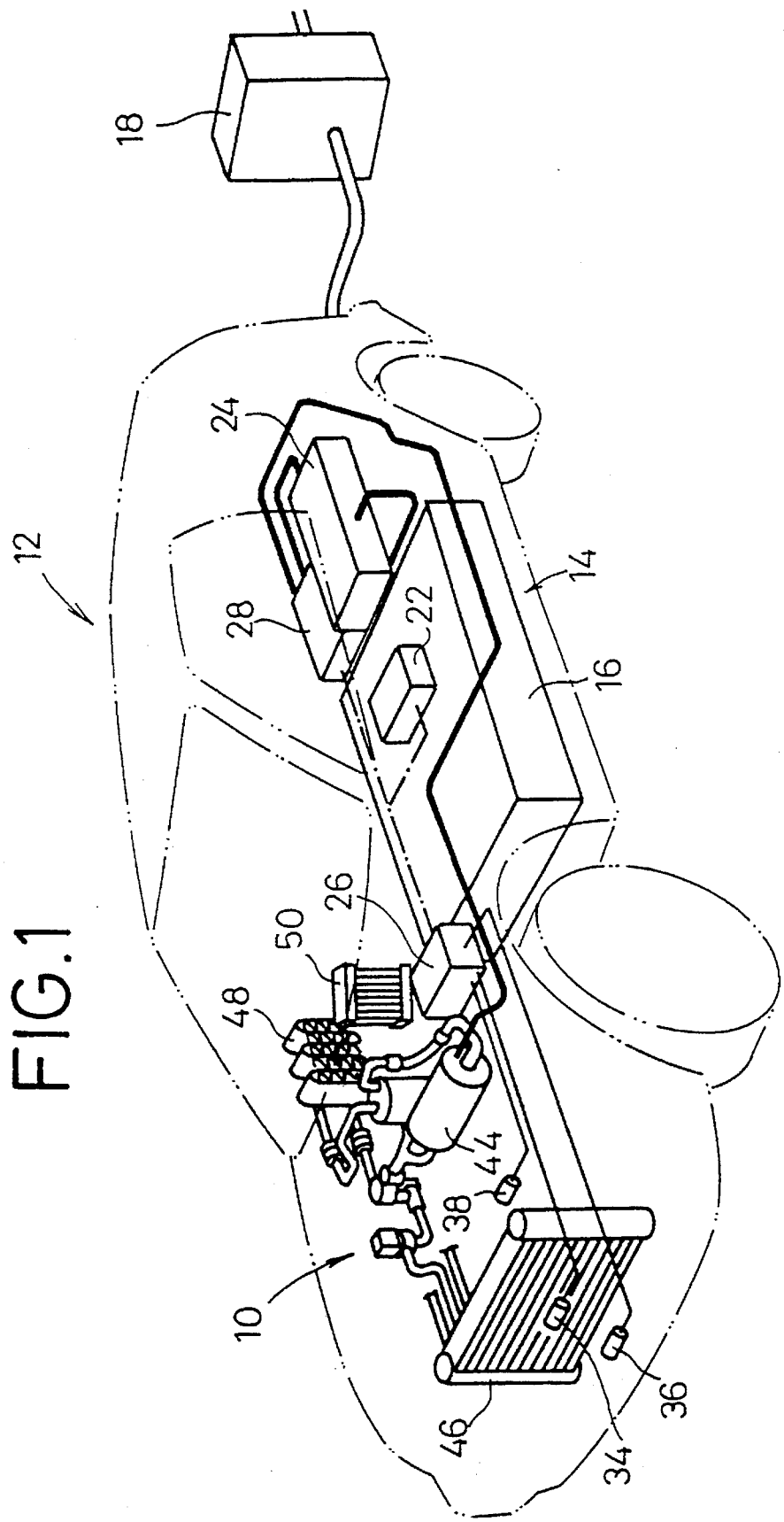
FIG. 1 is a schematic perspective view of an electric vehicle which incorporates a defrosting control system for use in an air-conditioner according to the present invention.

As shown in FIG. 1, an air-conditioner 10 is incorporated in an electric vehicle 12 and has a control circuit 14 (see also FIG. 2) for controlling itself and other devices on the electric vehicle 12.

The control circuit 14 has a management unit 22 for controlling electric energy supplied from a battery 16 mounted on the electric vehicle 12 and electric energy supplied from an external power supply 20 through a charging unit 18 to the battery 16. To the management unit 22, there are connected a junction box 24 for selecting the electric energy supplied from the battery 16 and the charging unit 18, and an air-conditioner control unit 26 for controlling the air-conditioner 10. The air-conditioner control unit 26 controls operation of the air-conditioner 10 through an inverter circuit 28 based on operation commands from a control panel 30 (see FIG. 3) which is installed at a driver's seat in the electric vehicle 12. A pre-air-conditioning timer 32 is connected to the air-conditioner control unit 26 for establishing a time to start a pre-air-conditioning mode for operating the air-conditioner 10 to achieve a comfortable environment in the cabin of the electric vehicle 12 before the driver enters the electric vehicle 12. The air-conditioner control unit 26 is supplied with a charging signal indicating that the battery 16 is being charged by the external power supply 20, and also with detected temperature signals from temperature sensors 34, 36 and 38 that are located in respective locations on the electric vehicle 12 for controlling the air-conditioner 10.

Figure 2:
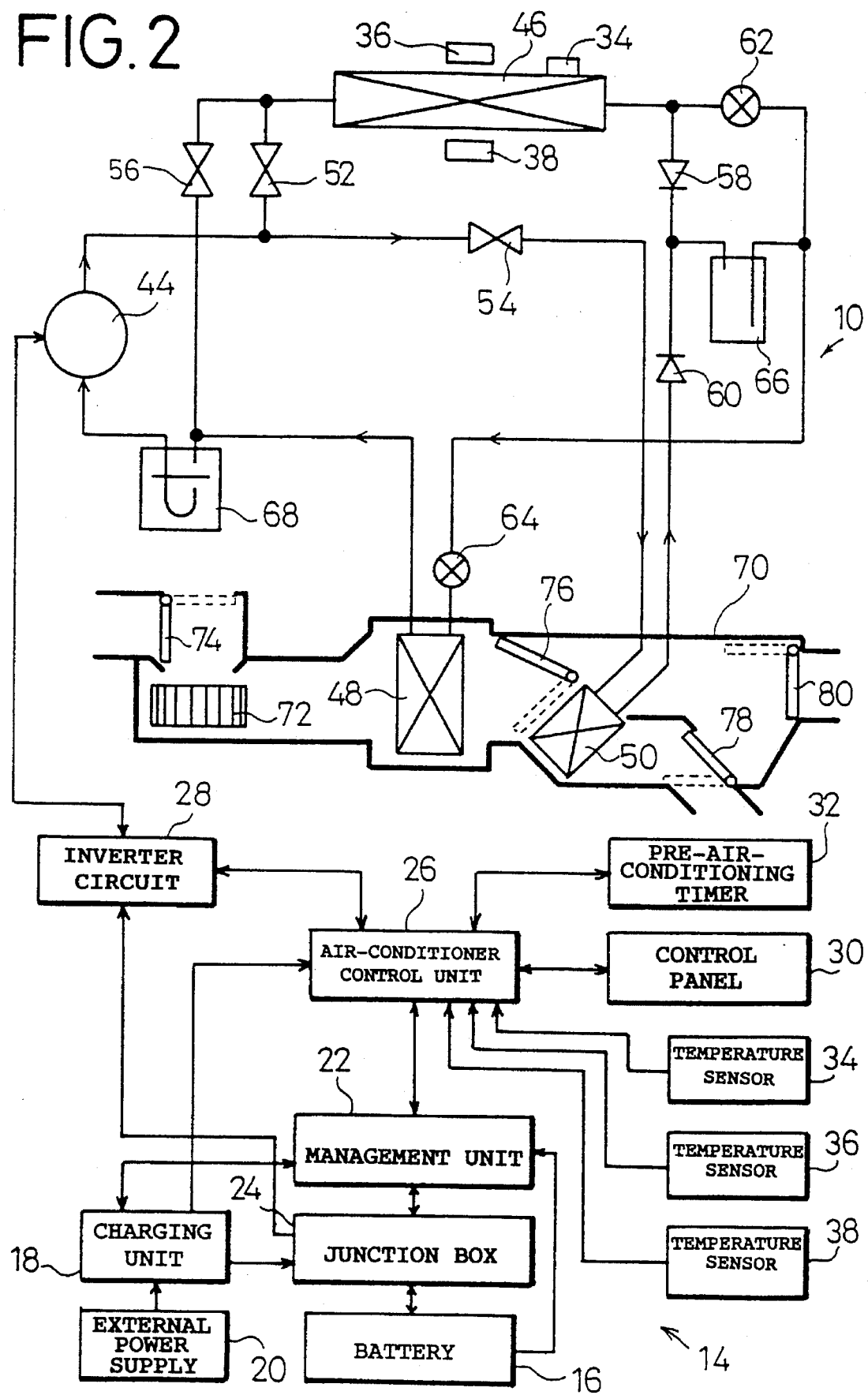
FIG. 2 is a block diagram of the air-conditioner and the defrosting control system.
Figure 3:
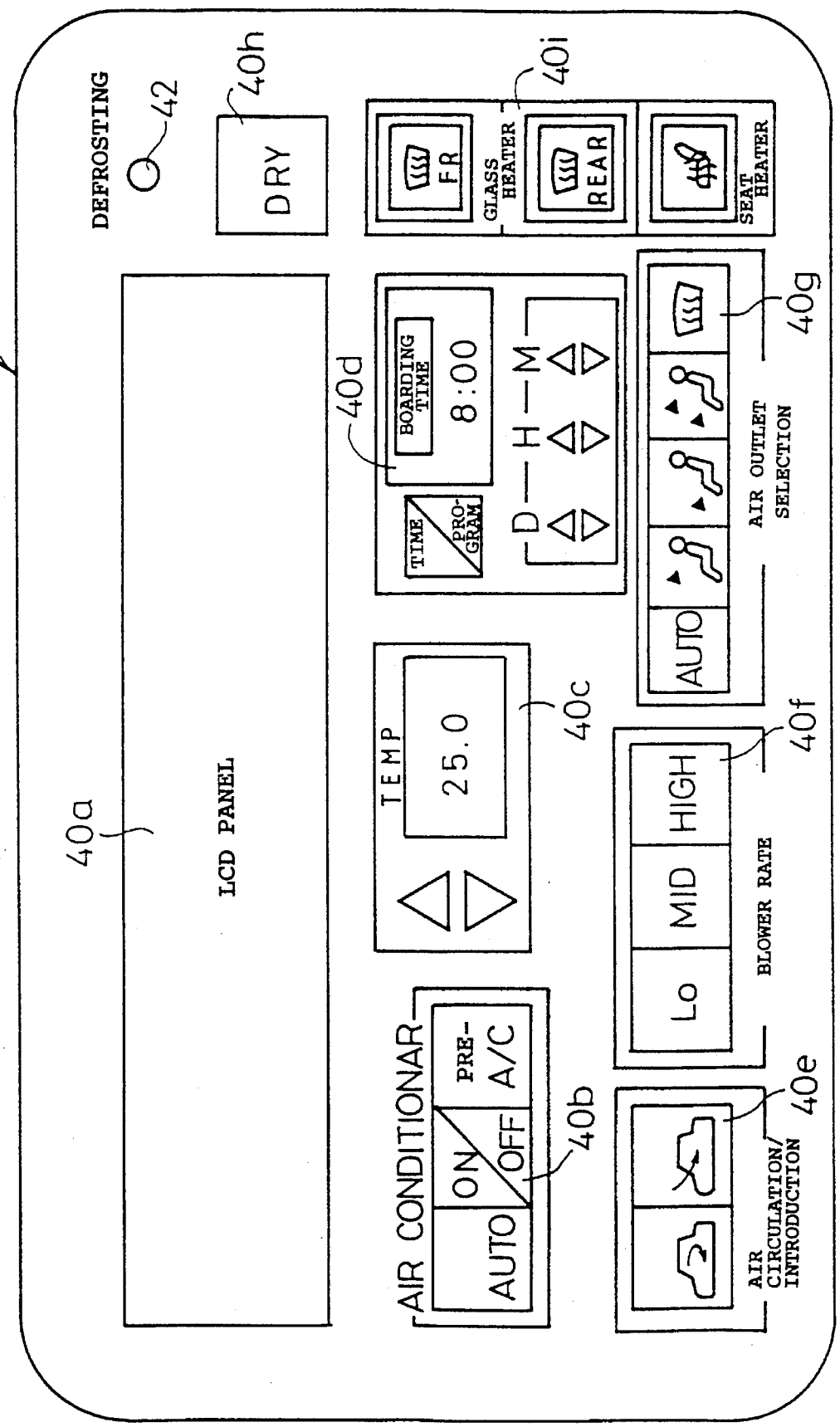
FIG. 3 is a front elevational view of a control panel of the air-conditioner.
Figure 4:
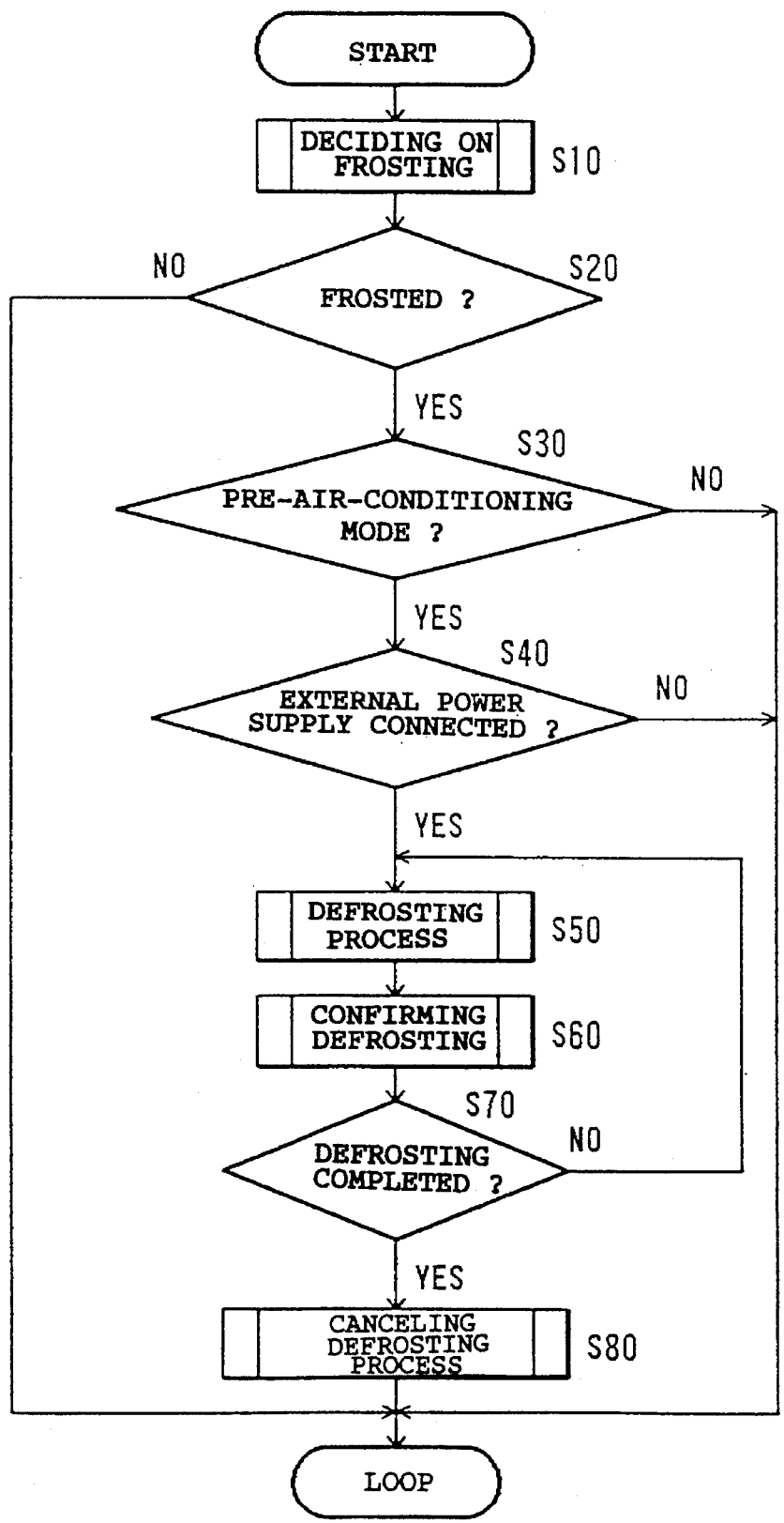
FIG. 4 is a flowchart of a main routine of an operation sequence of the defrosting control system.

As shown in FIG. 3, the control panel 30 has a liquid-crystal display panel 40a in its upper area for displaying detected temperatures and humidity, operation switches 40b disposed in a left-hand area below the liquid-crystal display panel 40a, the operation switches 40b including a switch (AUTO) for starting automatic control of the air-conditioner 10, a switch (ON/OFF) for turning on and off the air-conditioner 10, and a switch (PRE-A/C=pre-air-conditioning) for setting the pre-air-conditioning timer 32 to a time to start operating the air-conditioner 10, an operation switch 40c disposed on the right-hand side of the operation switches 40b for establishing a temperature, and an operation switch 40d disposed on the right-hand side of the operation switch 40c for establishing a time to enter the electric vehicle 12. The control panel 30 also has in a lower area thereof operation switches 40e for selecting air circulation and air introduction, operation switches 40f disposed on the right-hand side of the operation switches 40e for adjusting the rate of air introduced by an air blower 72 (see FIG. 2), and operation switches 40g for selecting air outlets. The control panel 30 further has in a right-hand area thereof an LED indicator 42 located in an uppermost position for indicating that the air-conditioner 10 is operating in a defrosting process, an operation switch 40h disposed below the LED indicator 42 for switching the air-conditioner 10 into a dehumidifying mode, and operation switches 40i disposed below the operation switch 40h for energizing various heaters.

As shown in FIGS. 1 and 2, the air-conditioner 10 has a motor-driven compressor 44 which is controlled by the inverter circuit 28, an external heat exchanger 46 disposed in the front grille of the electric vehicle 12, first and second internal heat exchangers 48, 50 disposed in the cabin of the electric vehicle 12, solenoid-operated valves 52, 54, 56 for controlling passages for the coolant supplied from the motor-driven compressor 44, check valves 58, 60, thermosensitive expansion valves 62, 64, a reservoir 66, and an accumulator 68. The first and second internal heat exchangers 48, 50 are disposed in a duct 70 in the cabin. The duct 70 also houses the air blower 72 and motor-driven dampers 74, 76, 78, 80. The external heat exchanger 46 is associated with the temperature sensor 34 which detects the temperature of the fins of the external heat exchanger 46. The temperature sensors 36, 38 are disposed respectively on an ambient side of the external heat exchanger 46 from which external air is introduced into the external heat exchanger 46 and an outlet side thereof from which air is discharged out of the external heat exchanger 46.

Operation of the air-conditioner 10 for defrosting the external heat exchanger 46 will be described below with reference to FIGS. 4 through 8.

When the operation switches 40b are operated to indicate a warming mode while the electric vehicle 12 is normal operation, the air-conditioner control unit 26 controls the inverter circuit 28 to actuate the air-conditioner 10 for thereby warming the cabin. At the same time, the air-conditioner control unit 26 determines whether the external heat exchanger 46 is frosted or not in a step S10.

The air-conditioner 10 operates in the warming mode with the solenoid-operated valve 52 closed and the solenoid-operated valves 54, 56 open. Specifically, as shown in FIG. 2, the coolant discharged from the motor-driven compressor 44 flows through the solenoid-operated valve 54 into the second internal heat exchanger 50 where the coolant is condensed, and then flows through the check valve 60 and the reservoir 66, after which the coolant is branched. A portion of the coolant flows through the expansion valve 64 into the first internal heat exchanger 48 where the coolant is evaporated, and then flows through the accumulator 68 into the motor-driven compressor 44. The remainder of the coolant flows through the expansion valve 62 into the external heat exchanger 46 where the coolant is evaporated, and then flows through the solenoid-operated valve 56 and the accumulator 68 into the motor-driven compressor 44. As a result, the second internal heat exchanger 50 radiates heat to warm the cabin, and the first internal heat exchanger 48 absorbs heat and causes condensation of water from the air to dehumidify the cabin. At this time, since the external heat exchanger 46 absorbs heat, the temperature $T_F$ of the fins of the external heat exchanger 46 as detected by the temperature sensor 34 is lowered.

Figure 5:
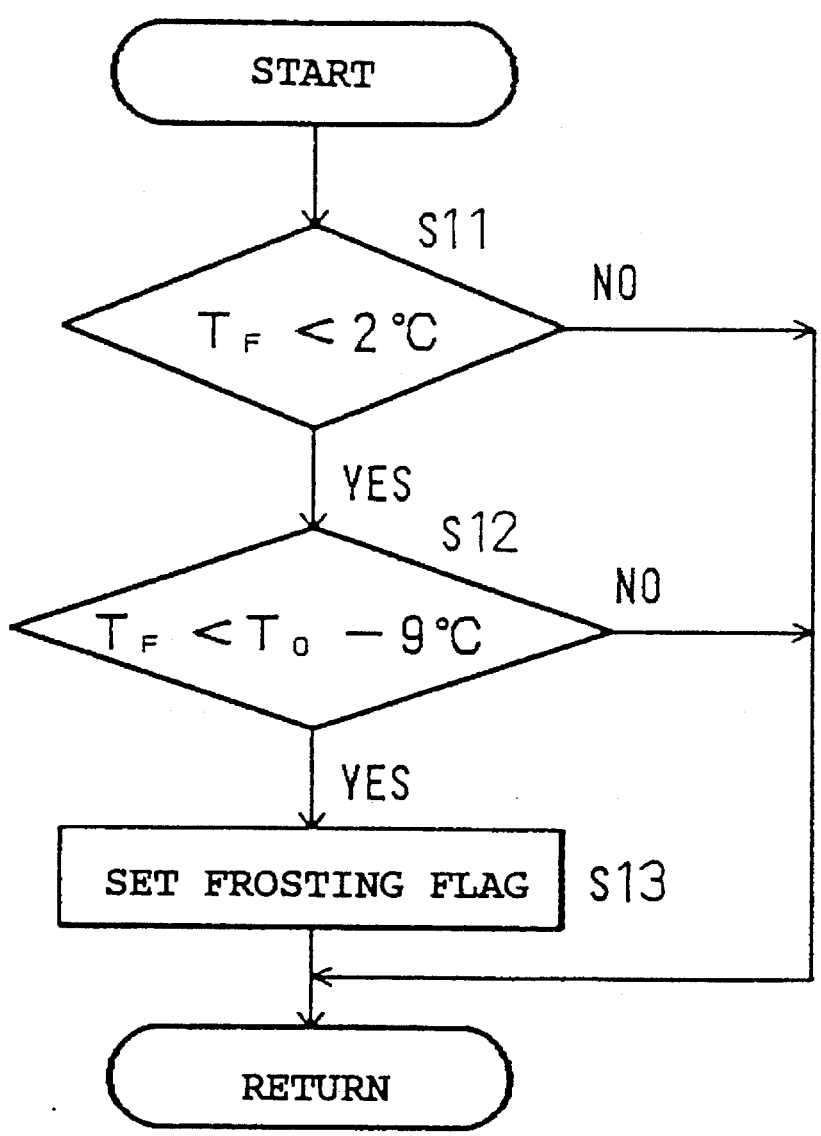
FIG. 5 is a flowchart of a subroutine of a process for determining whether an external heat exchanger is frosted or not.
Figure 6:
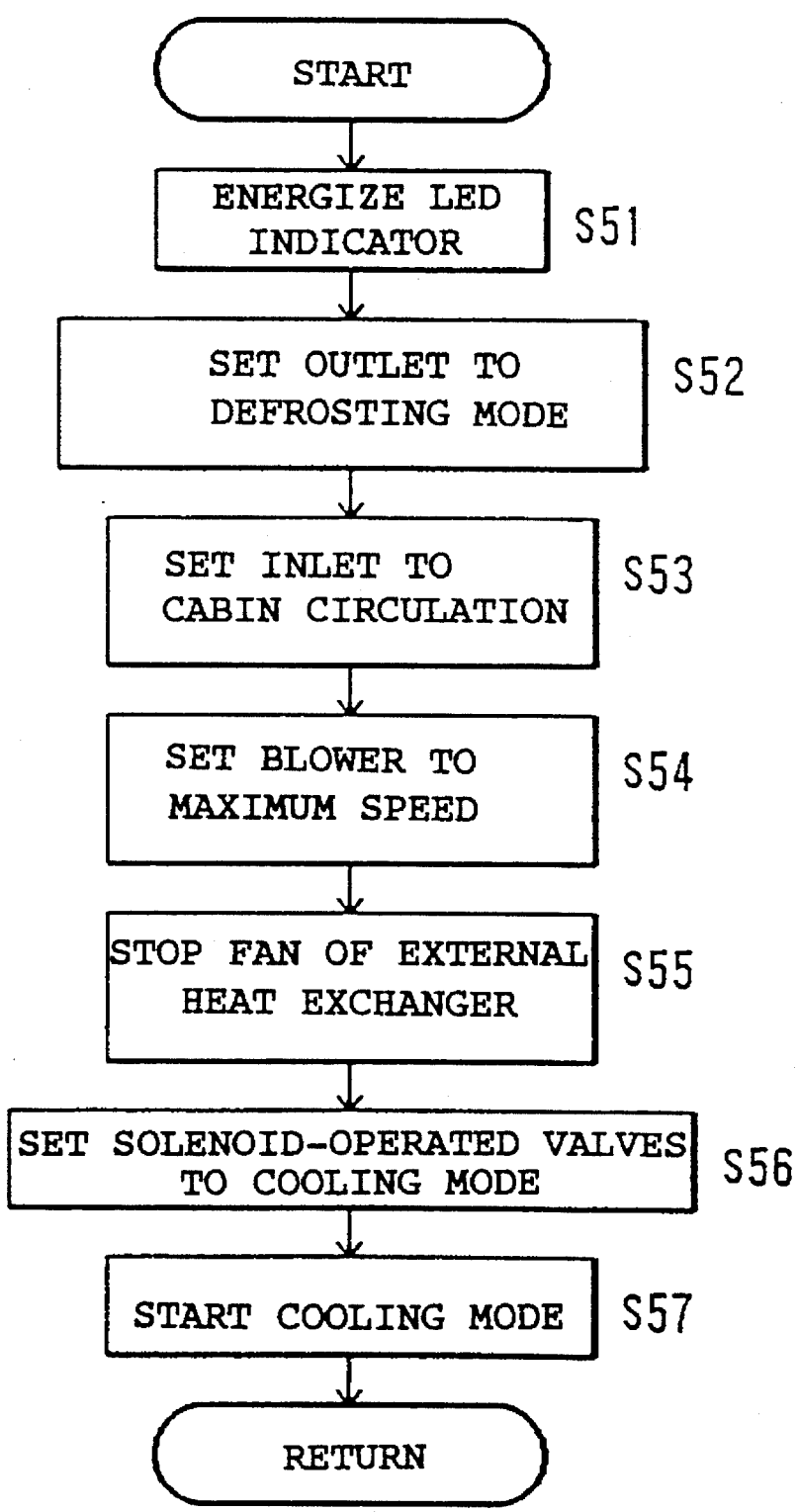
FIG. 6 is a flowchart of a subroutine of a process for defrosting the external heat exchanger.

The air-conditioner control unit 26 determines whether the external heat exchanger 46 is frosted or not in the step S10 according to a subroutine shown in FIG. 5. In FIG. 5, the temperature $T_F$ of the fins of the external heat exchanger 46 is detected by the temperature sensor 34. If the temperature $T_F$ is lower than 2° C. in a step S11, then it is determined that it is highly possible for the external heat exchanger 46 to be frosted. Then, the temperature $T_o$ of air on the outlet side of the external heat exchanger 46 is detected by the temperature sensor 38. If the temperatures $T_F$, $T_o$ satisfy the relation: $T_F < T_o - 9°$ C. in a step S12, then it is determined that the heat exchange efficiency of the external heat exchanger 46 is poor and it is highly possible for the external heat exchanger 46 to be frosted. If the two conditions in the steps S11, S12 are satisfied, then it is determined that the external heat exchanger 46 is frosted, and a frosting flag is set in the air-conditioner control unit 26 in a step S13. If neither of the two conditions in the steps S11, S12 are met, the procedure returns to the main routine.

When the external heat exchanger 46 is frosted, its capability to warm the cabin is lowered. If the electric vehicle 12 is in normal operation with the driver on board, then the warming mode is continued to give priority to establishing a desired comfortable environment in the cabin.

Then, when the driver leaves the electric vehicle 12, he or she can operate the PRE-A/C switch of the operation switches 40b on the control panel 30 shown in FIG. 3, and then the operation switches 40c, 40d to establish a pre-air-conditioning mode for automatically starting the warming mode before he or she enters the electric vehicle 12 next time. If the pre-air-conditioning mode is established, the pre-air-conditioning timer 32 is set to a desired time to start the pre-air-conditioning mode. When the external power supply 20 is connected to the electric vehicle 12 through the charging unit 18, the battery 16 starts being charged.

After the pre-air-conditioning mode has been established and the external power supply 20 has been connected to the electric vehicle 12, when the desired time to start the pre-air-conditioning mode is reached and the pre-air-conditioning timer 32 supplies a pre-air-conditioning mode start command signal to the air-conditioner control unit 26, the air-conditioner control unit 26 confirms a charging signal from the charging unit 18, and thereafter connects the external power supply 20 to the inverter circuit 28 through the junction box 24, whereupon the inverter circuit 28 operates the air-conditioner 10 with the electric energy supplied from the external power supply 20. Since this embodiment is concerned with defrosting the external heat exchanger 46, it is assumed that the temperature of the ambient air is low and that the air-conditioner 10 operates to warm the cabin in the pre-air-conditioning mode.

The air-conditioner control unit 26 determines whether the frosting flag has been set or not in a step S20. If the frosting flag has been set, then because the external heat exchanger 46 is frosted, the air-conditioner control unit 26 confirms that the air-conditioner 10 is operating in the pre-air-conditioning mode in a step S30, and that the external power supply 20 is connected to the charging unit 18 in a step S40, and starts the defrosting process. Specifically, when the external power supply 20 is connected to the charging unit 18, a charging signal indicating that the battery 15 is being charged is supplied to the air-conditioner control unit 26, so that the air-conditioner control unit 26 can confirm that the external power supply 20 is connected by detecting the charging signal. The connection of the external power supply 20 is detected in order to defrost the external heat exchanger 46 with the electric energy supplied from the external power supply 20 for thereby preventing the electric energy stored in the battery 16 from being consumed.

If it is determined that the external heat exchanger 46 has been frosted in the step S20 and the steps S30 and S40 have been satisfied, then the air-conditioner control unit 26 operates the air-conditioner 10 in a cooling mode to start defrosting the external heat exchanger 46 in a step S50. The external heat exchanger 46 is defrosted according to a subroutine shown in FIG. 6. First, the LED indicator 42 on the control panel 30 is energized, indicating that the external heat exchanger 46 is being defrosted in a step S51. Then, the motor-driven damper 80 is shifted to a defrosting position indicated by the broken line in a step S52, and the motor-driven damper 74 is shifted to a cabin circulating position indicated by the broken line in a step S53. The air blower 72 is rotated at a maximum speed in a step S54, and a fan (not shown) for the external heat exchanger 46 is stopped in a step S55. The solenoid-operated valve 52 is opened and the solenoid-operated valves 54, 56 are closed in a step S56, after which the air-conditioner 10 operates in the cooling mode in a step S57. The cooling mode includes a coolant circulation mode in which the coolant can be circulated at a high temperature under a high pressure to the external heat exchanger 46.

The air-conditioner 10 operates in the cooling mode with the solenoid-operated valve 52 open and the solenoid-operated valves 54, 56 closed. Specifically, as shown in FIG. 2, the coolant discharged from the motor-driven compressor 44 flows through the solenoid-operated valve 52 into the external heat exchanger 46 where the coolant is condensed, and then flows through the check valve 58 and the reservoir 66. Thereafter, the coolant flows through the expansion valve 64 into the first internal heat exchanger 48 where the coolant is evaporated, and then flows through the accumulator 68 into the motor-driven compressor 44. The first internal heat exchanger 48 absorbs heat to cool the cabin, and the external heat exchanger 46 radiates heat and is quickly defrosted.

Figure 7:
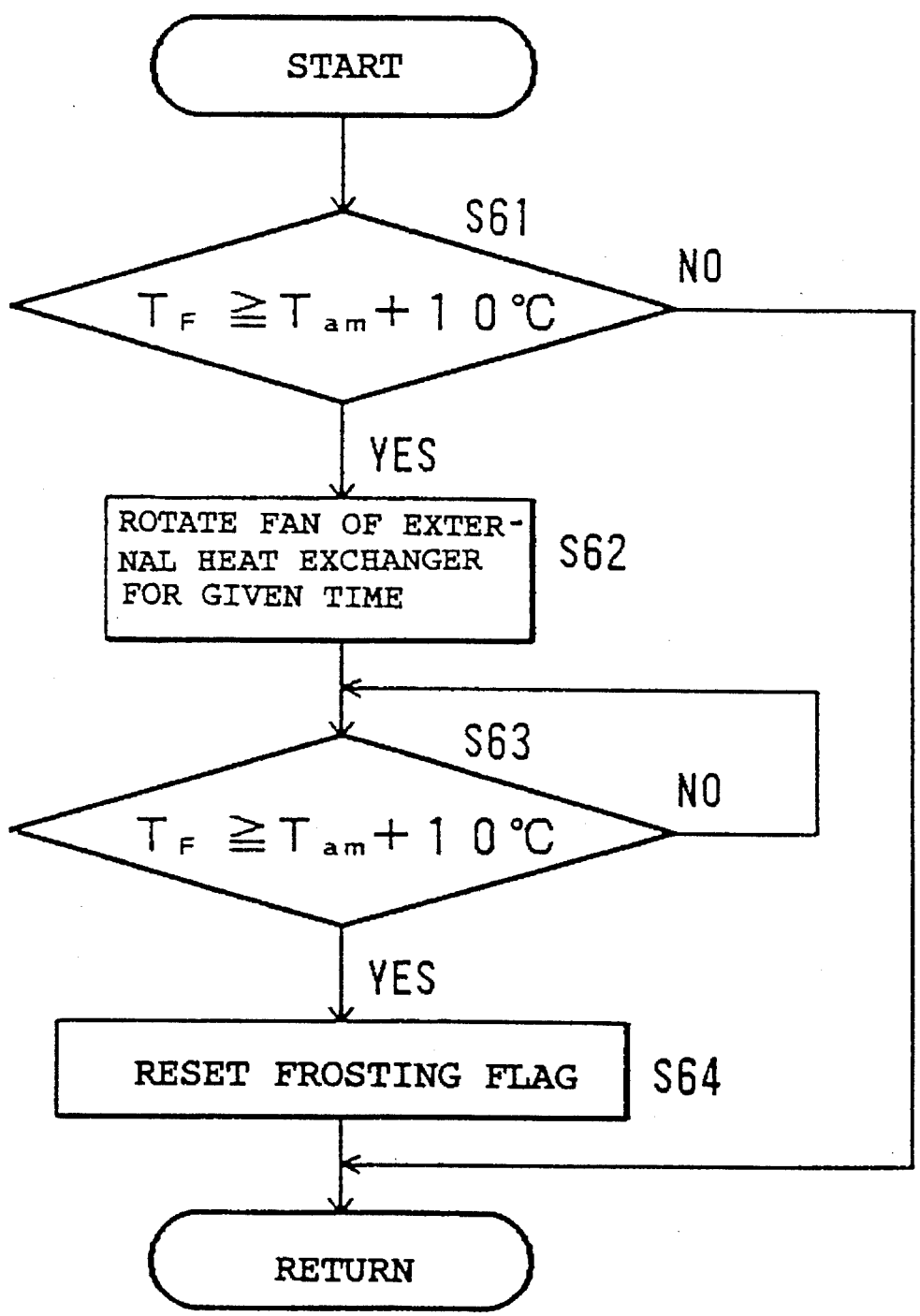
FIG. 7 is a flowchart of a subroutine of a process for confirming the completion of the defrosting process.

After the external heat exchanger 46 has been defrosted for a certain period of time, the air-conditioner control unit 26 determines whether the defrosting of the external heat exchanger 46 has been completed or not in a step S60 according to a subroutine shown in FIG. 7. The air-conditioner control unit 26 reads the temperature $T_F$ of the fins of the external heat exchanger 46 from the temperature sensor 34, reads the temperature $T_{am}$ of ambient air around the electric vehicle 12 from the temperature sensor 36, and determines whether the detected temperatures $T_F$, $T_{am}$ satisfy the relation: $T_F \geq T_{am} + 10°$ C. or not in a step S51. If the relation: $T_F \geq T_{am} + 10°$ C. is satisfied, then it is determined that the fins of the external heat exchanger 46 have sufficiently been warmed and defrosted. The fan (not shown) for the external heat exchanger 46 is rotated for a predetermined period of time to blow away water droplets from the fins of the external heat exchanger 46 in a step S62. The air-conditioner control unit 26 determines again whether the detected temperatures $T_F$, $T_{am}$ satisfy the relation: $T_F \geq T_{am} + 10°$ C. or not in a step 63. If the relation: $T_F \geq T_{am} + 10°$ C. is satisfied, then the air conditioner control unit 26 resets the frosting flag in a step S64. If the relation: $T_F \geq T_{am} + 10°$ C. is not satisfied, then the frosting flag is not reset.

Thereafter, the air-conditioner control unit 26 confirms the frosting flag in a step S70. If the frosting flag has been reset, then the air-conditioner control unit 26 cancels the defrosting process, i.e., the cooling mode effected by the air-conditioner 10, in a step S80 according to a subroutine shown in FIG. 8. When the completion of the defrosting process is confirmed, the air-conditioner control unit 26 turns off the LED indicator 42 on the control panel 30 in a step S81. Then, the air-conditioner control unit 26 brings the motor-driven dampers 74, 80, the air blower 72, the fan (not shown) for the external heat exchanger 46, and the solenoid-operated valves 52, 54, 56 back to their states prior to the defrosting process in steps S82, S83, S84, S85, S86. Thereafter, the air-conditioner control unit 26 switches the air-conditioner 10 from the cooling mode to the warming mode in a step S87. Since the external heat exchanger 46 has been defrosted in the defrosting process, the air-conditioner 10 operates efficiently to establish a comfortable environment in the cabin before the driver enters the electric vehicle 12.

While in the above embodiment the defrosting process is started on the condition that the pre-air-conditioning mode has been carried out by the air-conditioner 10 in the step S30, the pre-air-conditioning mode may not necessarily be required before the defrosting process is started. Instead, the air-conditioner control unit 26 may confirm whether a defrosting flag has been set or not at periodic intervals of time, and if the air-conditioner control unit 26 confirms that the defrosting flag has been set and the external heat exchanger 46 has been frosted in the step S20, then the air-conditioner control unit 26 may confirm the connection of the external power supply 20 in the step S40, and effect the defrosting process in step S50. In this modification, the air-conditioner 10 can be defrosted irrespective of whether the pre-air-conditioning mode has been established by the driver of the electric vehicle 12 or not.

Although a certain preferred embodiment of the present invention has been shown and described in detail, it should be understood that various changes and modifications may be made therein without departing from the scope of the appended claims.

What is claimed is:

1. A defrosting control system in a heat-pump air-conditioner for air-conditioning an electric vehicle with a compressor that is electrically actuated by the electric energy stored in a battery on the electric vehicle, comprising:

frosting determining means for determining whether an external heat exchanger of the air-conditioner is frosted;

air-conditioning operation detecting means for detecting whether the air-conditioner is operating in a pre-air-conditioning mode before a driver enters the electric vehicle; and defrosting means for operating the air-conditioner to defrost the external heat exchanger by causing the external heat exchanger to function as a heat radiator when the external heat exchanger is determined as being frosted by said frosting determining means and the air-conditioner is determined as operating in the pre-air-conditioning mode by said air-conditioning operation detecting means.

2. A defrosting control system according to claim 1, further comprising:

charging condition detecting means for detecting whether the battery is being charged by an external power supply;

said defrosting means comprising means for operating the air-conditioner to defrost the external heat exchanger with electric energy from the external power supply when the external heat exchanger is determined as being frosted by said frosting determining means and the battery is determined as being charged by said charging condition detecting means.

3. A defrosting control system according to claim 1, wherein said frosting determining means comprises:

a first temperature sensor for detecting a first temperature of fins of said external heat exchanger;

a second temperature sensor for detecting a second temperature of air at an outlet side of said external heat exchanger; and means for determining whether the external heat exchanger is frosted based on the difference between said first temperature detected by said first temperature sensor and said second temperature detected by said second temperature sensor.

4. A defrosting control system according to claim 3, wherein said frosting determining means comprises:

means for determining that the external heat exchanger is frosted when said first temperature is lower than a predetermined temperature and said first temperature is lower than a value produced by subtracting a predetermined value from said second temperature, while the air-conditioner is operating in a warming mode to warm the electric vehicle.

5. A defrosting control system according to claim 3, wherein said frosting determining means further comprises:

a third temperature sensor for detecting a third temperature of ambient air around the electric vehicle; and means for determining whether the defrosting of the external heat exchanger is completed based on said first temperature detected by said first temperature sensor and said third temperature detected by said third temperature sensor.

6. A defrosting control system according to claim 5, wherein said frosting determining means comprises:

means for determining that the defrosting of the external heat exchanger is completed when the first temperature is higher than or equal to said third temperature by a predetermined value while the external heat exchanger is being defrosted.

7. A defrosting control system according to claim 6, wherein said defrosting means comprises:

means for actuating a fan of said external heat exchanger for a predetermined period of time when said frosting determining means determines that the defrosting of the external heat exchanger is completed while the external heat exchanger is being defrosted.

8. A defrosting control system according to claim 7, wherein said frosting determining means comprises:

means for canceling the operation of the air-conditioner to defrost the external heat exchanger when the first temperature is higher than or equal to said third temperature by a predetermined value after the fan of said external heat exchanger has been actuated for the predetermined period of time while the external heat exchanger is being defrosted.

9. A defrosting control system in a heat-pump air-conditioner for air-conditioning an electric vehicle with a compressor that is electrically actuated by the electric energy stored in a battery on the electric vehicle, comprising:

charging condition detecting means for detecting whether the battery is being charged by an external power supply;

frosting determining means for determining whether an external heat exchanger of the air-conditioner is frosted; and defrosting means for operating the air-conditioner to defrost the external heat exchanger by causing the external heat exchanger to function as a heat radiator when the air-conditioner is operating in a heating mode, the external heat exchanger is determined as being frosted by said frosting determining means, and a charging condition is detected by the charging condition detecting means.

10. A defrosting control system according to claim 9, wherein said frosting determining means comprises:

a first temperature sensor for detecting a first temperature of fins of said external heat exchanger;

a second temperature sensor for detecting a second temperature of air at an outlet side of said external heat exchanger; and means for determining whether the external heat exchanger is frosted based on the difference between said first temperature detected by said first temperature sensor and said second temperature detected by said second temperature sensor.

11. A defrosting control system according to claim 10, wherein said frosting determining means comprises:

means for determining that the external heat exchanger is frosted when said first temperature is lower than a predetermined temperature and said first temperature is lower than a value produced by subtracting a predetermined value from said second temperature.

12. A defrosting control system according to claim 10, wherein said frosting determining means further comprises:

a third temperature sensor for detecting a third temperature of ambient air around the electric vehicle; and means for determining whether the defrosting of the external heat exchanger is completed based on said first temperature detected by said first temperature sensor and said third temperature detected by said third temperature sensor.

13. A defrosting control system according to claim 12, wherein said frosting determining means comprises:

means for determining that the defrosting of the external heat exchanger is completed when the first temperature is higher than or equal to said third temperature by a predetermined value while the external heat exchanger is being defrosted.

14. A defrosting control system according to claim 13, wherein said defrosting means comprises:

means for actuating a fan of said external heat exchanger for a predetermined period of time when said frosting determining means determines that the defrosting of the external heat exchanger is completed while the external heat exchanger is being defrosted.

15. A defrosting control system according to claim 14, wherein said frosting determining means comprises:

means for canceling the operation of the air-conditioner to defrost the external heat exchanger when the first temperature is higher than or equal to said third temperature by a predetermined value after the fan of said external heat exchanger has been actuated for the predetermined period of time while the external heat exchanger is being defrosted.

* * * * *